(12) United States Patent
Kakutani

(10) Patent No.: US 9,813,589 B2
(45) Date of Patent: Nov. 7, 2017

(54) PRINTING APPARATUS, PRINTING APPARATUS CONTROL METHOD, AND PROGRAM

(71) Applicant: CANON KABUSHIKI KAISHA, Tokyo (JP)

(72) Inventor: Naoya Kakutani, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/975,580

(22) Filed: Dec. 18, 2015

(65) Prior Publication Data

US 2016/0105588 A1    Apr. 14, 2016

Related U.S. Application Data

(63) Continuation of application No. 14/536,436, filed on Nov. 7, 2014, now Pat. No. 9,244,635, which is a
(Continued)

(30) Foreign Application Priority Data

May 21, 2012 (JP) ................................ 2012-115760

(51) Int. Cl.
*H04N 1/44* (2006.01)
*H04N 1/00* (2006.01)
(Continued)

(52) U.S. Cl.
CPC ......... *H04N 1/4413* (2013.01); *G06F 3/1204* (2013.01); *G06F 3/1222* (2013.01);
(Continued)

(58) Field of Classification Search
CPC .... G06F 21/608; G06F 3/1238; G06F 3/1222; G06F 3/1285; G06F 3/1204; G06F 3/126;
(Continued)

(56) References Cited

U.S. PATENT DOCUMENTS

| 8,908,203 B2* | 12/2014 | Kakutani | G06K 15/4095 358/1.14 |
| 2010/0238480 A1* | 9/2010 | Fukunishi | G06F 3/1222 358/1.14 |
| 2012/0162681 A1* | 6/2012 | Tomita | G06F 3/1222 358/1.13 |

FOREIGN PATENT DOCUMENTS

| JP | 2005086653 A | 3/2005 |
| JP | 2006007464 A | 1/2006 |

(Continued)

*Primary Examiner* — Thierry L Pham
(74) *Attorney, Agent, or Firm* — Canon U.S.A., Inc. IP Division

(57) ABSTRACT

A printing apparatus includes a receiving unit which receives print data, an operating unit which receives a print instruction from a user, a display unit which displays a password entry screen for receiving a password entry from a user, and a printing unit which receives a print instruction from a user through the operating unit and prints print data without accepting a password through a password entry screen if a password added to the print data is matched with a fixed password and print data to be printed if a print instruction from a user is received through the operating unit, if the password added to the print data is matched with the fixed password, and if the password received through a password entry screen is matched with the password added to the print data.

39 Claims, 15 Drawing Sheets

Related U.S. Application Data continuation of application No. 13/897,164, filed on May 17, 2013, now Pat. No. 8,908,203.

(51) Int. Cl.
*G06K 15/00* (2006.01)
*G06F 3/12* (2006.01)

(52) U.S. Cl.
CPC .......... *G06F 3/1238* (2013.01); *G06F 3/1267* (2013.01); *G06F 3/1285* (2013.01); *G06F 3/1287* (2013.01); *G06K 15/005* (2013.01); *G06K 15/4095* (2013.01); *H04N 1/00204* (2013.01); *H04N 2201/0094* (2013.01)

(58) Field of Classification Search
CPC ............... G06F 3/1287; H04N 1/4413; H04N 1/00204; H04N 2201/0094; G06K 15/4095; G06K 15/005
USPC .......................... 358/1.1, 1.4, 1.5, 1.11–1.18
See application file for complete search history.

(56) References Cited

FOREIGN PATENT DOCUMENTS

| | | | |
|---|---|---|---|
| JP | 2007083439 A | | 4/2007 |
| JP | 2011066714 A | | 3/2011 |
| JP | 2011223180 A | * | 11/2011 |

\* cited by examiner

FIG. 9

LIST OF PRINT PASSWORD PROTECTED JOBS — 9001

| SELECT | SERIAL NUMBER | TIME | JOB NAME | USER NAME | STATUS |
|---|---|---|---|---|---|
| | 0001 | 16:10 | Document1 | User1 | PRINT STANDBY |
| | 0002 | 16:20 | Document2 | User1 | PRINT STANDBY |
| | 0003 | 16:30 | Document3 | User1 | PRINT STANDBY |
| | 0004 | 16:40 | Document4 | User1 | PRINT STANDBY |
| | 0005 | 16:50 | Document5 | User1 | PRINT STANDBY |

9002

STOP 9004    PRINT 9003

PRINTING APPARATUS, PRINTING APPARATUS CONTROL METHOD, AND PROGRAM

The present application is a continuation of U.S. patent application Ser. No. 14/536,436, filed Nov. 7, 2014, entitled "PRINTING APPARATUS, PRINTING APPARATUS CONTROL METHOD, AND PROGRAM", which is a continuation of U.S. patent application Ser. No. 13/897,164, filed May 17, 2013, entitled "PRINTING APPARATUS, PRINTING APPARATUS CONTROL METHOD, AND PROGRAM", the content of both applications of which are expressly incorporated by reference herein in its entirety. Further, the present application claims the benefit of Japanese Patent Application No. 2012-115760 filed May 21, 2012, which is hereby incorporated by reference herein in its entirety.

BACKGROUND OF THE INVENTION

1. Field of the Invention

The present invention relates to printing apparatuses which print data to be printed (which sometimes will be called print data) received from an external device.

2. Description of the Related Art

A system has generally been known which temporarily stores (or reserves) print data transmitted from an external device such as a personal computer in a printing apparatus and prints it in response to a predetermined operation performed by a user on a control panel of the printing apparatus. Such a system is generally called a reservation printing system.

In a reservation printing system, a printing apparatus is shared over a network because a user may enter a password on an operation screen and/or a printed product is output in response to a user authentication, for example, and is particularly effective for preventing confidential printed product from being viewed by other people.

Japanese Patent Laid-Open No. 2000-76028 discloses a system in which a personal computer adds a password to print job and transmits it to a printing apparatus which then prints it in response to an entry of a password matched with the password added to the print job through a control panel of the printing apparatus.

SUMMARY OF THE INVENTION

The present invention provides a printing apparatus which saves user's time and efforts for executing a password-protected print job.

A printing apparatus according to an embodiment of the present invention includes a receiving unit which receives print data, a storage unit which stores the print data if a password is added to the print data, an operating unit which receives a print instruction from a user, a display unit which displays a password entry screen for receiving a password entry from a user, and a printing unit which prints the print data without receiving a password from a user through the password entry screen if the operating unit receives a print instruction from a user and if the password added to the print data is matched with a predetermined password and prints the print data if a password received through the password entry screen is matched with the password added to the print data, if the operating unit receives a print instruction from a user and if the password added to the print data is not matched with the predetermined password.

Further features of the present invention will become apparent from the following description of exemplary embodiments with reference to the attached drawings.

BRIEF DESCRIPTION OF THE DRAWINGS

FIG. 9 is a job list of password-protected printing jobs.

DESCRIPTION OF THE EMBODIMENTS

Embodiments of the present invention will be described below with reference to drawings.

First of all, terms and phrases for describing embodiments will be defined.

In embodiments, a print job containing print data and a password will be called a "password-protected printing job". A password-protected printing job in principle starts outputting a printed production on the basis of a proper password entered through an operating unit of a multifunction peripheral equipment. Such print protection with a password is for keeping security of the print. A reservation printing function using a password-protected printing job will be called a "password-protected reservation printing function".

According to embodiments, a password contained in a print job will be called a "job password". A job password is set for a print job as a unique password to the print job.

According to embodiments, a unique password to a multifunction peripheral equipment will be called a "fixed password". A fixed password is prestored in a hard disk in a multifunction peripheral equipment. Such a fixed password will be described in detail below.

According to embodiments, a password to be used for logging in a multifunction peripheral equipment by a user will be called a "log-in password".

According to embodiments, in order to implement the password-protected reservation printing function, print data is reserved in a storage device such as a hard disk in a printing apparatus, for example. However, alternatively, print data may be reserved in a print server instead of a storage device in a printing apparatus.

First Embodiment

Figure 1:
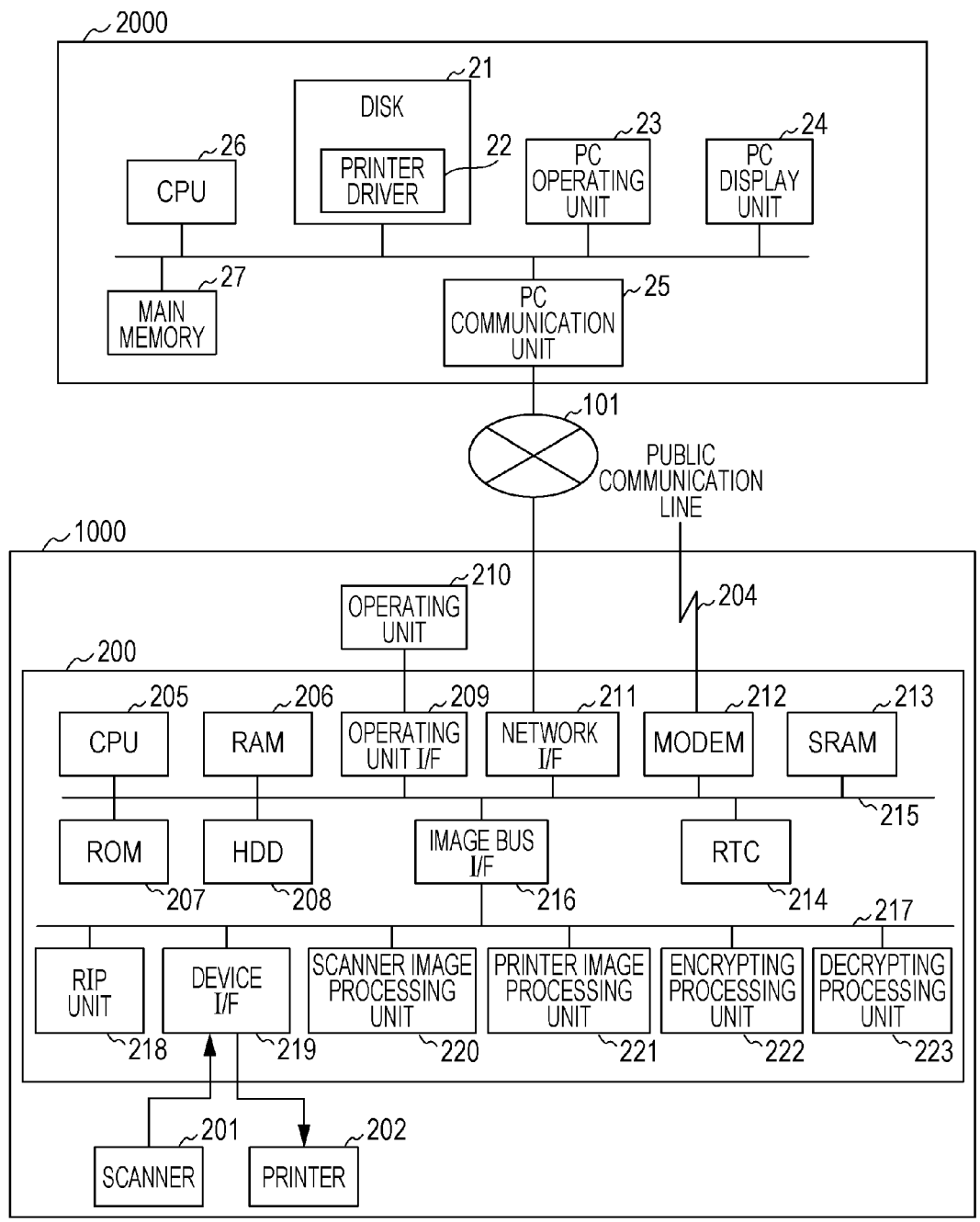
FIG. 1 is an overall diagram of a network system including a multifunction peripheral equipment that is an example of a printing apparatus and a PC that is an example of an external device.

FIG. 1 is an overall diagram of a network system including a digital multifunction peripheral equipment (hereinafter, simply called a "multifunction peripheral equipment") 1000 and a personal computer (hereinafter, simply called a PC) 2000. In the network system in FIG. 1, the multifunction peripheral equipment 1000 and the PC 2000 are connected communicably with each other over a network 101.

A plurality of multifunction peripheral equipments and/or PCs, not illustrated in FIG. 1, are connected to the network 101 through relay devices such as a switching hub and/or a router. The network system in FIG. 1 may be connected to another network through a router, not illustrated, connected to the network 101.

A unique IP address and a host name are given to each of the multifunction peripheral equipment 1000 and PC 2000. A domain name indicative of the position on the Internet is further given to the network system in FIG. 1.

According to this embodiment, a multifunction peripheral equipment will be described as an example of a printing apparatus. However, the printing apparatus may not necessarily be a multifunction peripheral equipment but a single function peripheral (SFP) as far as it supports the password-protected reservation printing function.

According to this embodiment, a personal computer (PC) will be described as an example of an external device (or information processing apparatus). However, it may not necessarily be a personal computer but an apparatus such as a shared desktop computer, a server computer, or a mobile terminal.

Next, a hardware configuration of the multifunction peripheral equipment 1000 will be described.

A control unit 200 connects a scanner 201 that is an image input device and a printer 202 that is image output device. The control unit 200 further inputs/outputs information to/from an external device by connecting to the network 101 or a public line 204.

A CPU 205 is a processor which generally controls the multifunction peripheral equipment 1000. A RAM 206 is a system work memory to be used by the CPU 205 for operation and also functions as memory for temporarily storing image data. A ROM 207 is a boot ROM and stores a boot program for the system. An HDD 208 is a hard disk drive and may store system software, an application, and image data. A program for executing a flowchart which will be described below according to this embodiment is also stored in the HDD 208. A program stored in the HDD 208 is loaded to the RAM 206 and is executed by the CPU 205.

Steps on flowcharts of this embodiment are executed by the CPU 205. However, other processors than the CPU 205 may execute the steps on flowcharts according to the embodiment, the CPU 205 may execute the steps in conjunction with other processors.

An operating unit interface 209 connects to an operating unit 210 having a liquid crystal touch panel and output image data to be displayed on the operating unit 210 to the operating unit 210. The operating unit interface 209 plays a role of informing the CPU 205 of information input by a system user (user) through the operating unit 210. A network interface 211 is connected to the network 101 and may input/output information to/from the PC 2000, for example. A MODEM 212 is connected to the public line 204 and may convert a digital signal to an analog signal. An SRAM 213 is a non-volatile recording medium which may operate at high speed. An RTC 214 is a real time clock and performs processing of keeping counting the current time even when power is not supplied to the control unit 200. These components are arranged on a system bus 215.

An image Bus I/F 216 is a bus bridge which is connected to the system bus 215 and an image bus 217 which transfers image data at high speed and converts a data structure. An image bus 217 includes a PCI bus or an IEEE1394. The following components are arranged on the image bus 217.

An RIP unit 218 is a raster image processor and expands PDL code to a bitmap image. A device I/F unit 219 connects the scanner 201 and/or printer 202 and the control unit 200 and performs synchronous//asynchronous conversion on image data. The scanner image processing unit 220 may correct, process, and/or edit input image data. The printer image processing unit 221 performs printer correction and resolution conversion on printed output image data. An encrypting processing unit 222 performs processing of encrypting input data containing image data. A decoding processing unit 223 performs processing of decrypting encrypted data.

Next, a hardware configuration of the PC 2000 will be described. The PC 2000 has a CPU 26, a main memory 27, a disk 21, a PC operating unit 23, PC communication unit 25, and a PC display unit 24. The CPU 26 is a processor which controls an operation of the PC 2000. The CPU 26 loads a program stored in the disk 21 to the main memory 27 and executes corresponding processing. The disk 21 may store a program such as an operating system and/or a document creation application. The disk 21 may further store a printer driver program (hereinafter, simply called a printer driver) 22 corresponding to the multifunction peripheral equipment 1000.

The PC communication unit 25 transmits and receives information to and from another apparatus connected to the network 101. The PC operating unit 23 may be a mouse or a keyboard, for example, and function as an input device which receives an input from a user. The PC display unit 24 may be a liquid crystal display, for example, and the CPU 26 functions as an output device which outputs processed data.

Figure 2:
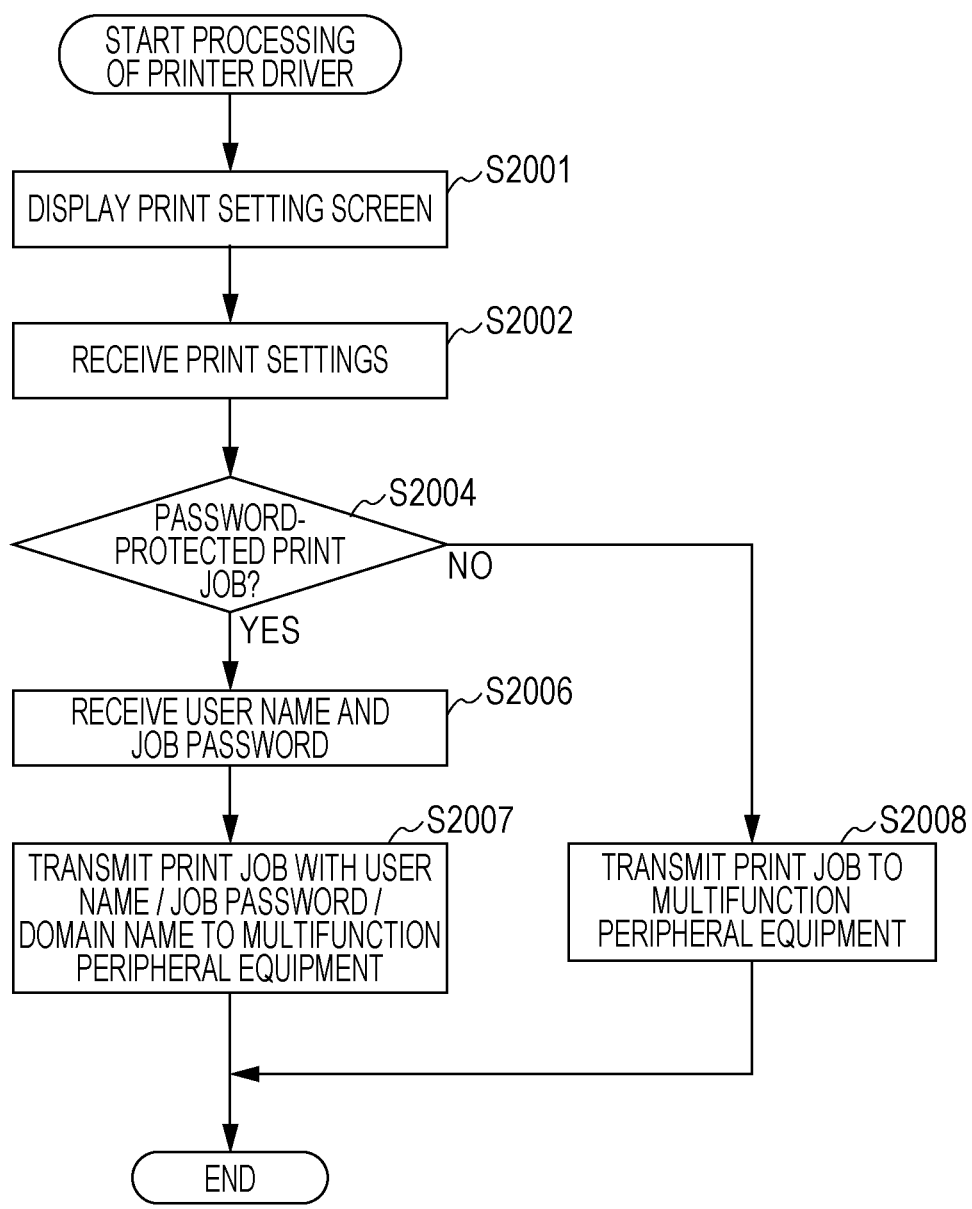
FIG. 2 is a flowchart illustrating processing of transmitting a print job to be executed in a PC.

FIG. 2 is a flowchart describing processing of transmitting a password-protected printing job from the PC 2000 to the multifunction peripheral equipment 1000. The steps on the flowchart in FIG. 2 are to be executed by the CPU 26.

First in step S2001 ("step" will be omitted in the following description), the PC 2000 receives an instruction to print in the multifunction peripheral equipment 1000 from a user through the PC operating unit 23. In response to the instruction, the CPU 26 starts the printer driver 22 corresponding to the multifunction peripheral equipment 1000 and displays a print setting screen 0301 as illustrated in FIG. 3A on the PC display unit 24.

Figure 3A:
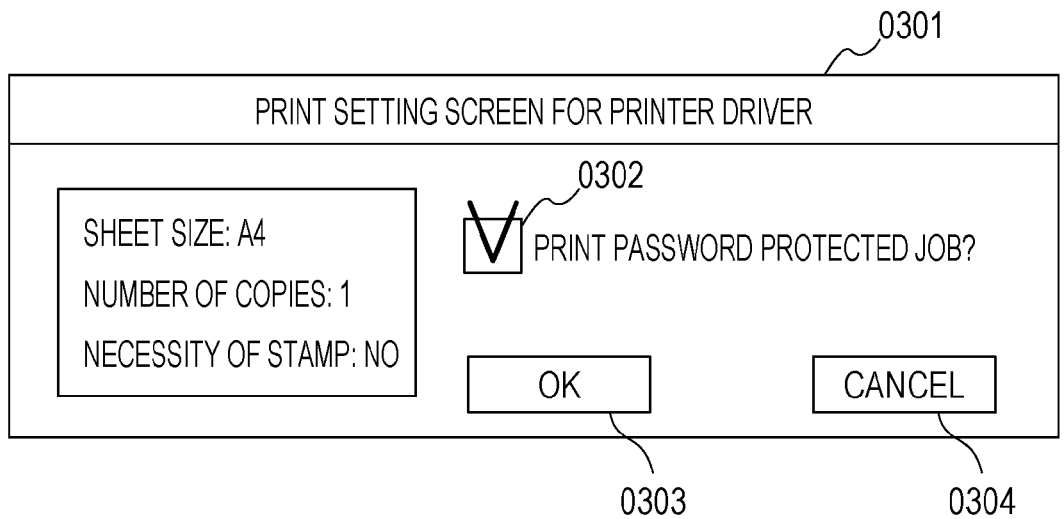
FIGS. 3A-B illustrate an example of a setting screen of a printer driver in a PC.

FIG. 3A illustrates an example of a screen to be displayed by the printer driver 22 in S2001. The print setting screen 0301 in FIG. 3A displays a check box 0302, an OK button 0303, and a cancel button 0304 for setting whether password-protected printing is to be validated or not.

If the check box 0302 is checked, a job password is added to the print job and is transmitted to the multifunction peripheral equipment 1000. On the print setting screen 0301, print settings including a sheet size, the number of copies and the necessity of stamp may be defined, and a print job including the print settings defined on the print setting screen 0301 is generated. In the example in FIG. 3A, print settings are defined in which the password-protected printing is valid, and print sheet size is A4, the number of copies is 1, and no stamp is necessary.

Next in S2002, the printer driver 22 receives an operation by a user on the print setting screen 0301 and writes print settings to a RAM (not illustrated) in the PC 2000. In response to the detection of the press of the OK button 0303 indicating that the settings for the print job have been defined, the processing moves to S2004.

In S2004, the printer driver 22 determines whether a password-protected printing job is to be generated on the basis of the settings received in S2002 or not.

Figure 3B:
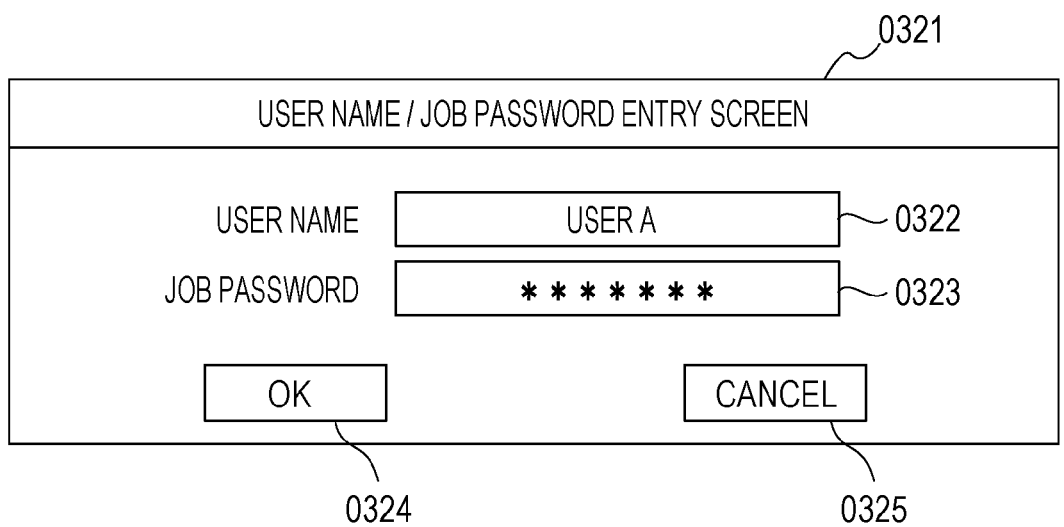

If it is determined that the password-protected printing job is to be generated, the printer driver 22 in S2006 displays a user name and password entry screen illustrated in FIG. 3B on the PC display unit 24 and receives a user name and a password from a user. On the other hand, if it is determined that the password-protected printing job is not to be generated (that is, a normal print job is to be generated), the printer driver 22 in S2008 generates a print job in accordance with the defined print settings and transmits the print job to the multifunction peripheral equipment 1000.

FIG. 3B illustrates a user name/password entry screen 0321 to be displayed in S2006. On the screen illustrated in FIG. 3B, a user enters a user name to a user name entry form 0322 and enters a job password to a password entry form 0323. The entered user name and job password are added to the print job which is then transmitted to the multifunction peripheral equipment 1000. Note that because a password-protected printing job to be transmitted from the PC 2000 to the multifunction peripheral equipment 1000 contains a password, it may not be transmitted in plain text. In order to prevent eavesdropping, encryption processing may be performed on the job password entered by a user or a hush value calculated from a job password may be transmitted instead of the job password.

A user name to be entered to the user name entry form 0322 is an identifier with which a print job owner is identifiable. A user name is used later when a user logging in the multifunction peripheral equipment 1000 is compared with a job owner (however, it is not used for the comparison if the user is not authenticated in the multifunction peripheral equipment 1000). Notably, a user name may be changed as required on the screen illustrated in FIG. 3B. A user name defined as an initial value in the PC 2000 is preset on the screen illustrated in FIG. 3B.

A job password to be entered to the password entry form 0323 is information to be requested later for starting printing in the multifunction peripheral equipment 1000. In other words, a print job to which a job password has been added (password-protected printing job) is reserved having a print standby state in the multifunction peripheral equipment 1000 and is started to print in response to entry of the job password (job password entered by a user in FIG. 3B) through the operating unit 210. Thus, only the person or people who knows or know the job password added to a print job may permit the password-protected printing job to output its printed product, which may protect the printed product from eavesdropping by a person who should not know the job password and maintain security robustly.

However, in order to execute a password-protected printing job, a user may be prompted to enter a job password in PC 2000 and also to enter the job password in the multifunction peripheral equipment 1000. A user may be required to enter a password twice, taking time and labor, while its security may be maintained. According to this embodiment, after a fixed password registered with the multifunction peripheral equipment 1000 is entered to the password entry form 0323 on the screen illustrated in FIG. 3B, the password may not be entered again in the multifunction peripheral equipment 1000. This part will be described below in more detail.

Referring back to FIG. 2, in S2006, the printer driver 22 receives a user name and a job password entered by a user through the PC operating unit 23. Here, the user name and job password entered through the PC operating unit are displayed on the user name entry form 0322 and password entry form 0323 illustrated in FIG. 3B. The PC operating unit 23 receives a press of a password-protected printing job setting complete button 0324 by a user, and the processing moves to S2007.

In S2007, the printer driver 22 generates a print job in which a domain name of the PC 2000, a user name and a job password are added to data to be printed as a password-protected printing job.

Note that the user name added to the print job generated in S2007 is to be used for a comparison between a user logging in the multifunction peripheral equipment 1000 and an owner of the job. The job password is used for starting printing in the multifunction peripheral equipment 1000. The domain name is used for determining whether the PC 2000 and the multifunction peripheral equipment 1000 belong to a same domain or not.

The processing of transmitting a print job from the printer driver 22 in the PC 2000 to the multifunction peripheral equipment 1000 has been described.

Figure 4:
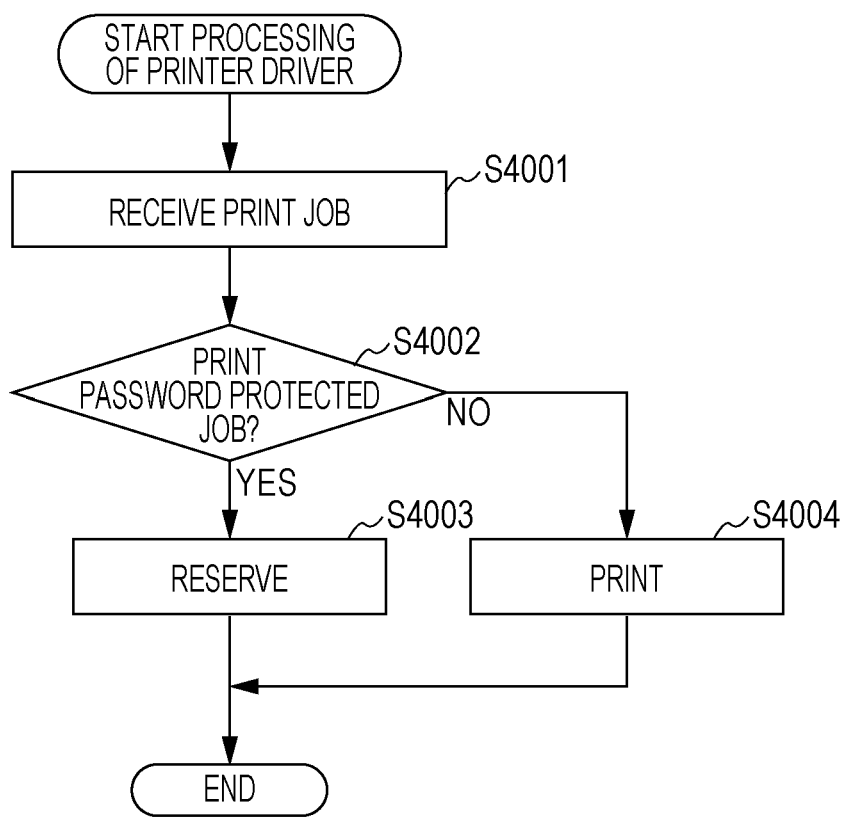
FIG. 4 is a flowchart illustrating processing of receiving a print job to be executed in a multifunction peripheral equipment.

FIG. 4 is a flowchart describing a series of operations when the multifunction peripheral equipment 1000 receives a print job. The steps on the flowchart in FIG. 4 are implemented by execution by the CPU 205 of a program loaded from the HDD 208 to the RAM 206. The processing on the flowchart in FIG. 4 is automatically started in response to reception of a print job from the PC 2000 or another PC, not illustrated.

In S4001, the CPU 205 receives a print job transmitted from the PC 2000, for example, through the network interface 211 and extracts print data and print settings from the received print job. The CPU 205 transfers the extracted print data to the RIP unit 218. The RIP unit 218 decompresses the received print data to a bitmap image and stores it in the HDD 208.

In S4002, the CPU 205 determines whether the received print job is a password-protected printing job or not from the print settings extracted in S4001. More specifically, the determination may be implemented by determining whether the password-protected printing job contains a job password or not. If it is determined that the received print job is a password-protected printing job, the processing moves to S4003. In S4003, the CPU 205 stores the decompressed bitmap image in the RIP unit 218 in association with the print standby status in the HDD 208 (S4003). The bitmap image data stored in S4003 is not output to the printer 202 until the comparison between the job password and a password entered through the operating unit 210. In other words, the received password-protected printing job is reserved here without printing. Further in S4003, the domain name, user name and job password contained in the print settings are managed in association with the bitmap image data.

If it is determined in S4002 that the job is not a password-protected printing job (that is, if it is a normal print job), the CPU 205 outputs the bitmap image decompressed in the RIP unit 218 to the printer 202. In response thereto, the printer 202 prints the image based on the received bitmap image data on a print sheet (S4004).

This is a series of operations to be performed when the multifunction peripheral equipment 1000 receives a print job.

Figure 5:
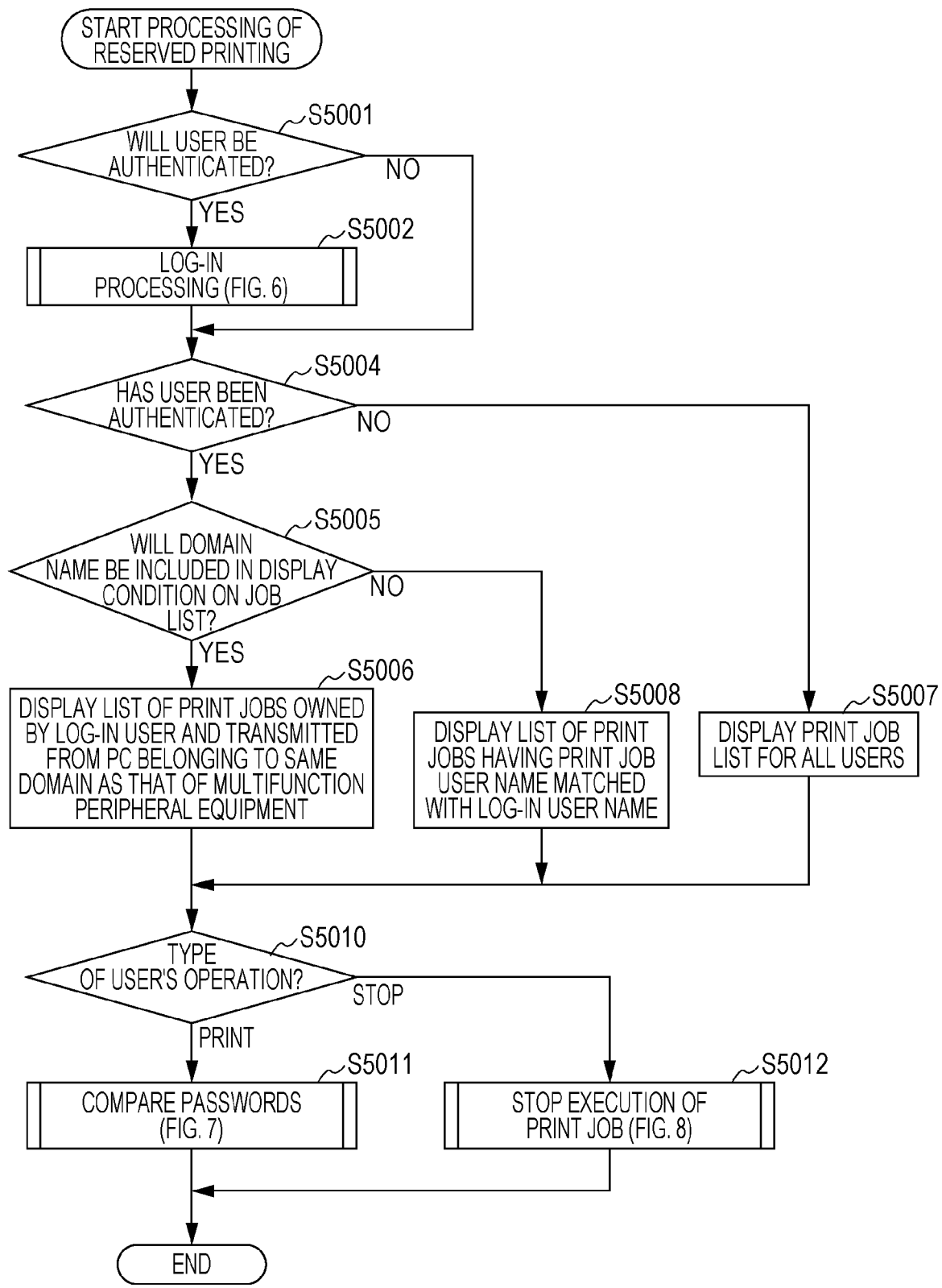
FIG. 5 is a flowchart describing an operation for executing a password-protected printing job.

FIG. 5 is a flowchart for executing a password-protected printing job reserved in S4003. The steps described on the flowchart in FIG. 5 are implemented by execution by the CPU 205 of a program loaded from the HDD 208 to the RAM 206, like FIG. 4.

In S5001, the CPU 205 acquires a set value for the multifunction peripheral equipment 1000 stored in the SRAM 213 and determines whether a user authentication is to be performed or not on the basis of the acquired set value. In this embodiment, a set value indicating whether a user authentication is to be validated or not is read from the HDD 208 upon start of the multifunction peripheral equipment 1000 and is stored in the SRAM 213. In S5001, whether a user authentication is to be performed or not is determined on the basis of the set value read from the SRAM 213. It is assumed that a setting regarding whether a user authentication is to be validated or not and/or user authentication information to be used for validating a user authentication are registered in advance with the multifunction peripheral equipment 1000 by a system manager, for example. Though it has been described that the setting is stored in the SRAM 213 upon start in S5001, it may be stored in the SRAM 213 upon first access instead of the start.

If it is determined in S5001 to perform a user authentication, the processing moves to S5002 where log-in processing is performed. The log-in processing will be described in detail with reference to FIG. 6. When a user logs in the multifunction peripheral equipment 1000 for the log-in processing, information on the log in user is written to the RAM 206, and the processing moves to S5004. On the other hand, if it is determined in S5001 not to perform a user authentication, the log-in processing in S5002 is omitted, and the processing moves to S5004.

In S5004, the CPU 205 acquires a set value stored in SRAM 213 indicating that a user authentication has been performed, and the multifunction peripheral equipment 1000 determines whether a user authentication has been performed or not. In other words, if the set value acquired from the SRAM 213 indicates that a user authentication has been performed, YES is determined in S5004. On the other hand, if the set value acquired from the SRAM 213 indicates that a user authentication has not been performed, NO is determined in S5004.

If it is determined in S5004 that a user authentication has not been performed, the processing moves to S5007 where a job list of all password-protected printing jobs managed having a print standby status is displayed on the operating unit 210.

If it is determined in S5004 that a user authentication has been performed, the processing moves to S5005. In S5005, the CPU 205 determines whether the domain name is to be included in the display condition on the job list or not. The determination is performed on the basis of the set value stored in the SRAM 213. It is assumed that a set value indicating whether a domain name is included in a display condition on a job list or not, which is used for the determination processing in S5005 is also registered in advance with the multifunction peripheral equipment 1000 by a system manager, for example, like a set value to be used for the processing in S5001.

If YES is determined in S5005, the processing moves to S5006. In S5006, the CPU 205 acquire a user name of the log-in user from the RAM 206 and acquire a domain name and a user name of a password-protected printing job managed having a print standby status from the print settings of the received print job. When the log-in processing completes, a log-in context containing a user name by which a log-in user is identifiable is written to the RAM 206, which will be described below in detail with reference to FIG. 6. The CPU 205 identifies the log-in user on the basis of the log-in context written to the RAM 206. In S5006, the CPU 205 displays on the operating unit 210 a job list of a password-protected printing job under a user name matched with the user name of the log-in user, which is a password-protected printing job transmitted from a PC (such as the PC 2000) belonging to a same domain as the multifunction peripheral equipment 1000. Whether a given password-protected printing job has been transmitted from a PC belonging to a same domain or not is determined through a comparison between a domain name of a network system to which the multifunction peripheral equipment 1000 belongs and a domain name contained in the password-protected printing job.

If NO is determined in S5005, the processing moves to S5008 where the CPU 205 acquires a user name of the log-in user from the RAM 206 and user names of password-protected printing jobs managed having a print standby status. The CPU 205 displays on the operating unit 210 a job list of password-protected printing jobs under a user name matched with the acquired user name of the log-in user. In other words, a list of all print jobs owned by the log-in user is displayed.

S5006 and S5008 are different in that whether a list of jobs transmitted from a PC belonging to a different domain from that of the multifunction peripheral equipment 1000 is displayed or not. In other words, in S5008, a print job under one user name is transmitted from a plurality of different domains.

For example, a case will be considered where the multifunction peripheral equipment 1000 and the PC 2000 belongs to a domain X and another PC belongs to a domain Y (which is a different domain from that of the multifunction peripheral equipment 1000). In this case, a password protected print job under a user name "User 1" is transmitted from the PC 2000 and the other PC. When a user with the user name "User 1" logs in the multifunction peripheral equipment 1000, a print job under the "User 1" transmitted from the PC 2000 is displayed in S5006. In S5008, a print job transmitted from the PC 2000 and a print job transmitted from the other PC are displayed.

FIG. 9 illustrates an example of the job list displayed in S5006 or S5008. A print job list 9002 is a list of password-protected printing jobs owned by the log-in user. A print button 9003 is used to instruct to start printing a selected print job. A stop button 9004 is used to cancel printing of a selected print job.

The print job list 9002 displays print job identification information including whether a print job has been selected or not, serial number, received time of a print job, print job name, a user name of a user who has entered a print job (that is, the owner of a print job), a status of the job, etc.

The job type to be displayed in the print job list 9002 is password-protected printing job only, but other print job (that is, normal print job) than the password-protected printing job may be displayed simultaneously.

In S5010, a selection of a password-protected printing job to be operated from the print job list 9002 displayed in S5006, S5007 or S5008 is received. If a password-protected printing job is selected, a selection check box 9005 corresponding to the selected job is checked and the job has a selected state, which enables the stop button 9004 and print button 9003. In S5010, the CPU 205 further receives an operation on the stop button 9004 or the print button 9003 through the operating unit 210. For example, a user may instruct printing the selected password-protected printing job by pressing the print button 9003. On the other hand, in order to stop the execution of a print job, a user may cancel the printing by pressing the stop button 9004. In S5010, whether the received instruction is "print" or "stop" is determined. If "print" is determined, the method moves to password comparison processing (S5011). On the other hand, if "stop" is determined, the method moves to stop processing (S5012). The password comparison processing will be described in detail with reference to FIG. 7, and the stop processing will be described in detail with reference to FIG. 8.

The general operations to be performed when the operating unit 210 of the multifunction peripheral equipment 1000 receives a user operation have been described.

Figure 6:
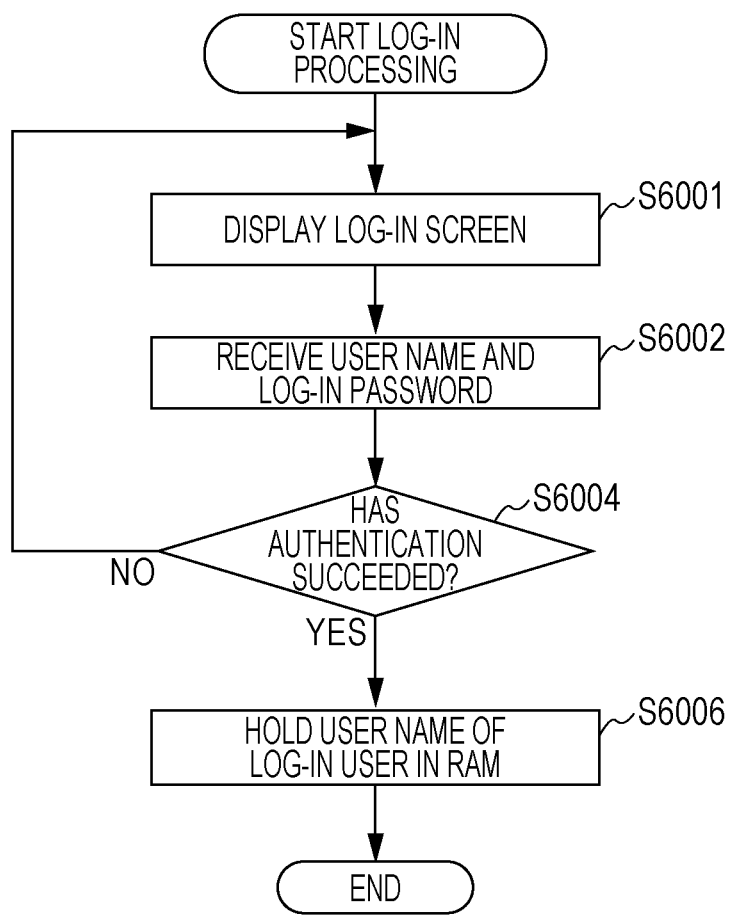
FIG. 6 is a flowchart illustrating log-in processing to be executed in a multifunction peripheral equipment.

FIG. 6 is a flowchart describing the log-in processing executed in S5002 in FIG. 5 in details.

In S6001, the CPU 205 displays a log-in screen on the operating unit 210 and receives a user name and a log-in password through the log-in screen in S6002. The entered user name and log-in password are written to the RAM 206 through the operating unit interface 209.

In S6004, the CPU 205 performs a user authentication on the basis of the user name and log-in password received in S6002. If the authentication is successful, the log in to the multifunction peripheral equipment 1000 is permitted. The processing then moves to S6005. On the other hand, if the authentication fails, the CPU 205 display an error screen (not illustrated) on the operating unit 210 and prohibits the use of the multifunction peripheral equipment 1000. The processing returns to S6001.

In S6006, the CPU 205 stores a log-in context containing the user name received in S6002 in the RAM 206, and the log-in processing ends. The log-in context contains, in addition to a user name, information such as a log-in time, expiration date, and user's authority information (a general user or a manager). A set value indicating that a user has been authenticated is written to the SRAM 213. Here the set value written to the SRAM 213 is referred when the determining processing in S5004 in FIG. 5 is performed.

The log-in processing has been described above in detail.

Figure 7:
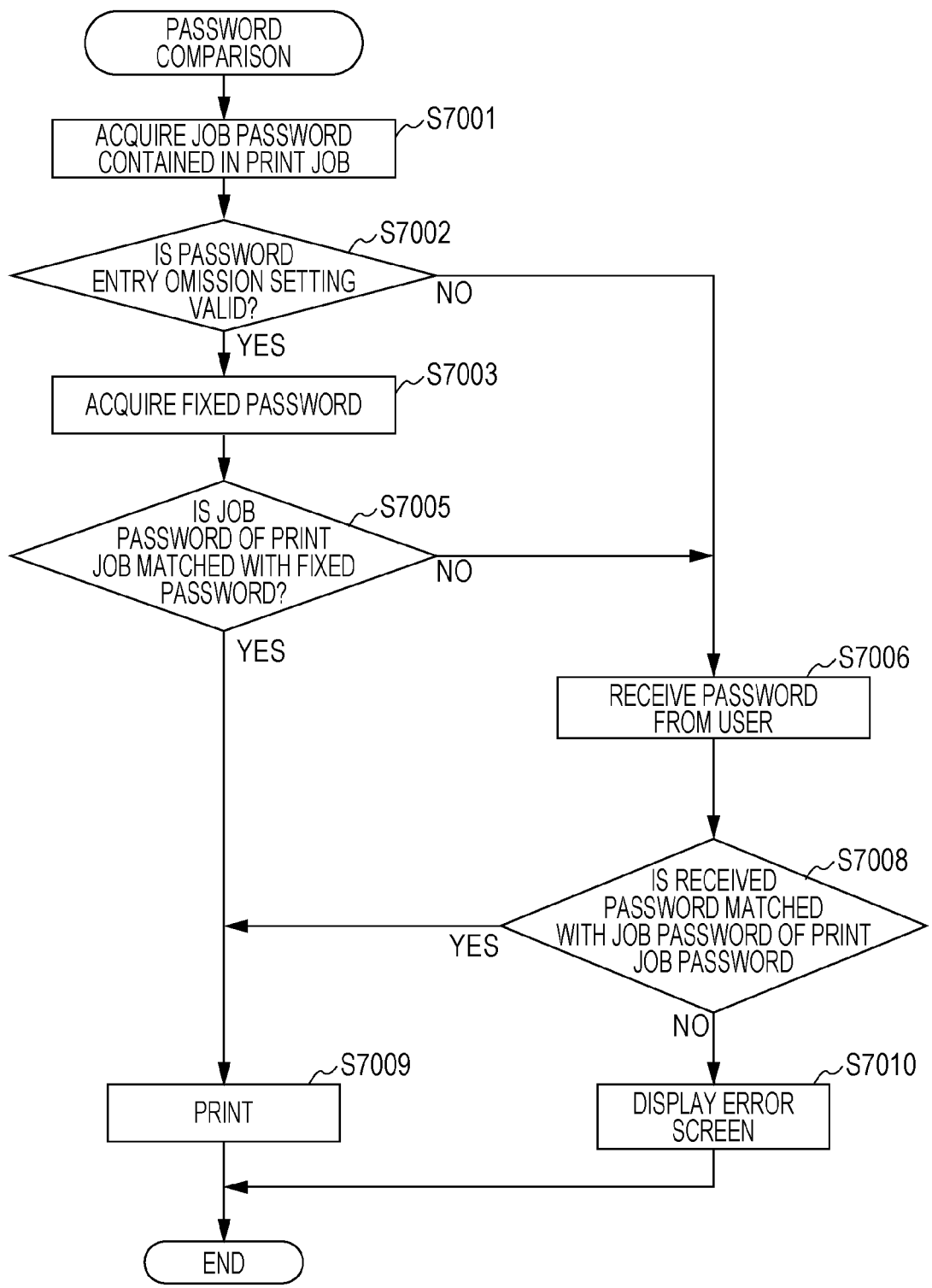
FIG. 7 is a flowchart illustrating processing of printing to be executed in a multifunction peripheral equipment.

FIG. 7 is a flowchart describing operations that is a principal objective of this embodiment, which corresponds to the password comparison processing in S5011 in FIG. 5.

In S7001, the CPU 205 acquires a job password of a password-protected printing job instructed to print from the HDD 208.

Next in S7002, the CPU 205 acquires a password entry omission setting (see FIG. 10) for the multifunction peripheral equipment 1000 from the SRAM 213. If the password entry omission setting acquired from the SRAM 213 is valid, the processing moves to S7003. On the other hand, if the set value acquired from the SRAM 213 is invalid, the processing moves to S7003. If the password entry omission setting is valid and if the job password contained in a print job is matched with a corresponding fixed password, the password entry will be omitted.

Figure 10:
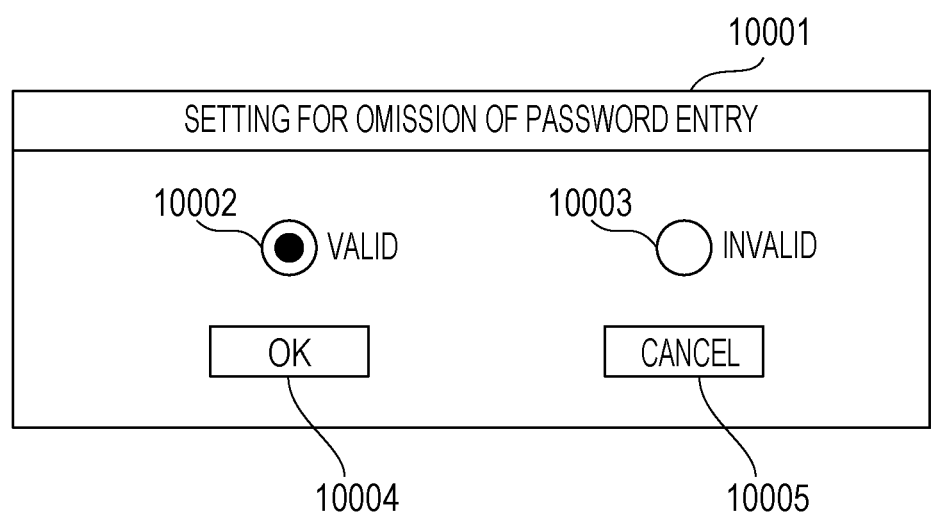
FIG. 10 is a screen example for a password entry omission setting to be defined in a multifunction peripheral equipment.

The set value described here may be preset by a system manager on a setting screen 10001 illustrated in FIG. 10. FIG. 10 illustrates a screen for validating or invalidating the password entry omission setting, which is to be displayed on the operating unit 210. If a valid button 10002 or an invalid button 10003 is selected on the setting screen 10001 and an OK button 10004 is selected by a system manager, for example, the CPU 205 writes a set value indicating whether the password entry omission setting is to be validated or not to the SRAM 213. According to this embodiment, the fixed password to be used for indicating that the password entry omission setting is valid is a fixedly predetermined password upon shipment of the multifunction peripheral equipment 1000. However, the fixed password may be determined by a system manager when the valid button 10002 is selected and the OK button 10004 is selected, instead of at the time of shipment. The fixed password may be determined on the basis of a serial number and/or a MAC address that is unique to an apparatus, instead of being determined by a system manager. A fixed password is distributed on a paper medium or in other communication means (such as an electronic mail) to an authorized user who frequently uses the multifunction peripheral equipment 1000 to protect it from unauthorized users. A fixed password is stored in the HDD 208.

Referring back to FIG. 7, in S7002, the CPU 205 determines whether the password entry omission setting defined on the setting screen 10001 in FIG. 10 shows a valid value or not. If it is determined as having a valid value, the CPU 205 acquires a fixed password from the HDD 208 and stores it in the SRAM 213 (S7003).

On the other hand, if it is determined in S7002 that the password entry omission setting shows an invalid value, the CPU 205 displays a password entry screen (not illustrated) on the operating unit 210 and prompts a user to enter a password (S7006). If a password is received from a user on the password entry screen, the processing moves to S7008.

In S7005, the CPU 205 compares the fixed password for the obtained multifunction peripheral equipment 1000 and the job password for the password-protected printing job. If the CPU 205 determines that the fixed password for the multifunction peripheral equipment 1000 and the job password for the password-protected printing job are matched (YES in S7005), the CPU 205 executes printing the password-protected printing job (S7009). In other words, the password-protected printing job is executed without requiring a user to enter a password.

If it is determined in S7005 that the job password for the password-protected printing job and the fixed password are not matched, the CPU 205 displays the password entry screen (not illustrated) on the operating unit 210 and prompts a user to enter a password (S7006).

In S7008, the CPU 205 compares the password entered by a user through the password entry screen displayed on the operating unit 210 and the job password for the password-protected printing job.

In S7008, if the CPU 205 determines that the password entered by a user is matched with the job password for the password-protected printing job, the CPU 205 executes printing the password-protected printing job (S7009). In other words, as soon as the printer 202 gets ready for printing, the CPU 205 outputs bitmap image data to the printer 202 which than prints the image on a print sheet.

If it is determined in S7008 that the password entered by a user is not matched with the job password for the password-protected printing job, the CPU 205 displays an error screen (not illustrated) on the operating unit 210 (S7010), and the processing ends.

The operations of the password comparison processing has been described above.

Next, processing of stopping a password-protected printing job will be described with reference to the flowchart in FIG. 8.

Figure 8:
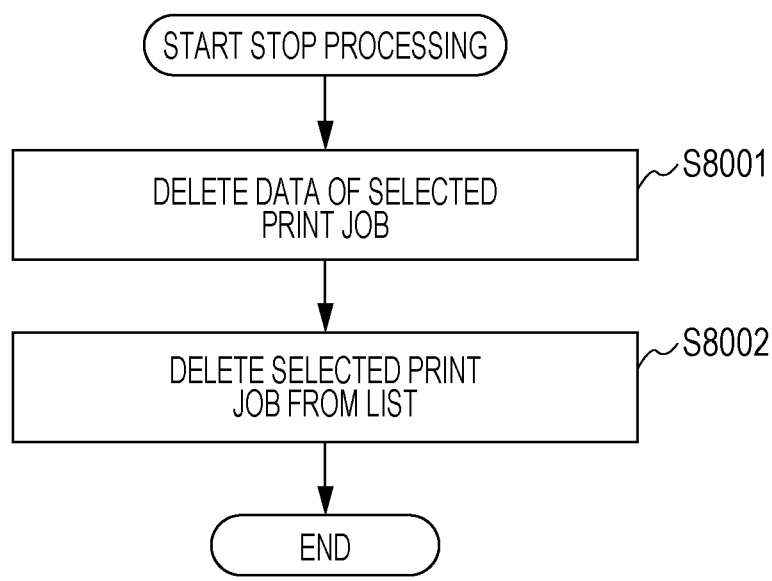
FIG. 8 is a flowchart illustrating processing of stopping printing to be executed in a multifunction peripheral equipment.

FIG. 8 is a flowchart describing the stop processing in S5012 in FIG. 5.

First, in S8001, the CPU 205 deletes data (bitmap image data) on a password-protected printing job instructed to stop from the HDD 208. Next, in S8002, the CPU 205 deletes the password-protected printing job selected to stop from the print job list 9002 displayed on the operating unit 210, and the processing on the flowchart in FIG. 8 ends.

The operations according to the first embodiment have been described. According to the first embodiment, a user who knows a fixed password may enter the fixed password (alternative to a job password) on a print setting screen of a printer driver of a PC so that he/or she can be released from time and labor for entering the password again to a multifunction peripheral equipment. In other words, while a password must be entered at least 2 twice in the past, a user who knows a fixed password may be required to enter the password only once.

Furthermore, according to the first embodiment, a user who does not know a fixed password may be enter a password that is not the fixed password to a PC 2000 to display a password entry screen like a method in the past to execute a password-protected printing job. In other words, a password to be entered or displayed on the password entry form 0323 may be either fixed password or job password. This embodiment may further be characterized in that a plurality of different kinds of password may be entered on one form on one screen.

Furthermore, according to the first embodiment, even a user who has not been authenticated may enter a print job by giving it a password unique to a corresponding printing apparatus to implement reservation printing while security is maintained. This is particularly effective when setting a unique password for each print job is complicated.

Furthermore, according to the first embodiment, an operation which requires password entry and an operation which allows omission of password entry may be selectively performed by a multifunction peripheral equipment on the basis of the set value defined on the setting screen 10001 in FIG. 10. Thus, properly, for example, the entry of a password is required in an environment where unspecified users use a multifunction peripheral equipment, and the password entry may be omitted in an environment where only specified users use the multifunction peripheral equipment.

According to this embodiment, only one fixed password is available for the multifunction peripheral equipment 1000. However, a plurality of fixed passwords may be registered instead of one fixed password. Applications may be possible in which a fixed password is registered for each user managed by the multifunction peripheral equipment 1000. In this case, a password for a password-protected printing job instructed to print and a fixed password of a log-in user are automatically compared. In this manner, the number of fixed password is not particularly limited.

According to this embodiment, the password comparison processing (see FIG. 7) is executed when printing is instructed. However, it may be performed when print data is received from the PC 2000 instead of the time when printing is instructed. In other words, in S4002, whether print data contains a fixed password or a password unique to a job may be determined. In this case, information indicating either print job containing a fixed password or a print job containing a password unique to a job may be prestored in the multifunction peripheral equipment 1000 in association with print data, and whether password entry is to be omitted or be required may be determined on the basis of the information.

Second Embodiment

Next, a second embodiment will be described.

According to the first embodiment, the multifunction peripheral equipment 1000 performs a printing operation in accordance with a result of a comparison between a fixed password and a job password for a password-protected printing job if the password entry omission setting is valid whether or not the multifunction peripheral equipment 1000 performs a user authentication. However, according to the first embodiment, if the multifunction peripheral equipment 1000 does not perform a user authentication, a user who will use the multifunction peripheral equipment is not identifiable. Therefore, a list of all print jobs is displayed (see S5007). Therefore, a user who is not an owner of a print job may possibly instruct printing if the multifunction peripheral equipment 1000 does not perform a user authentication. For that reason, the password entry should not be omitted even if the password entry omission setting is valid in an environment where the multifunction peripheral equipment 1000 is used without user authentication.

According to the second embodiment, omission of password entry is prohibited in an environment where the multifunction peripheral equipment 1000 is used without user authentication, for example. In other words, according to the second embodiment, omission of password entry is permitted in an environment where a multifunction peripheral equipment performs a user authentication. On the other hand, password entry is required in an environment where a multifunction peripheral equipment does not perform user authentication.

The processing of the second embodiment is same as the processing of the first embodiment only except for the password comparison processing in FIG. 7. The system configurations and hardware configurations of the apparatuses are same as those of the first embodiment.

Figure 11:
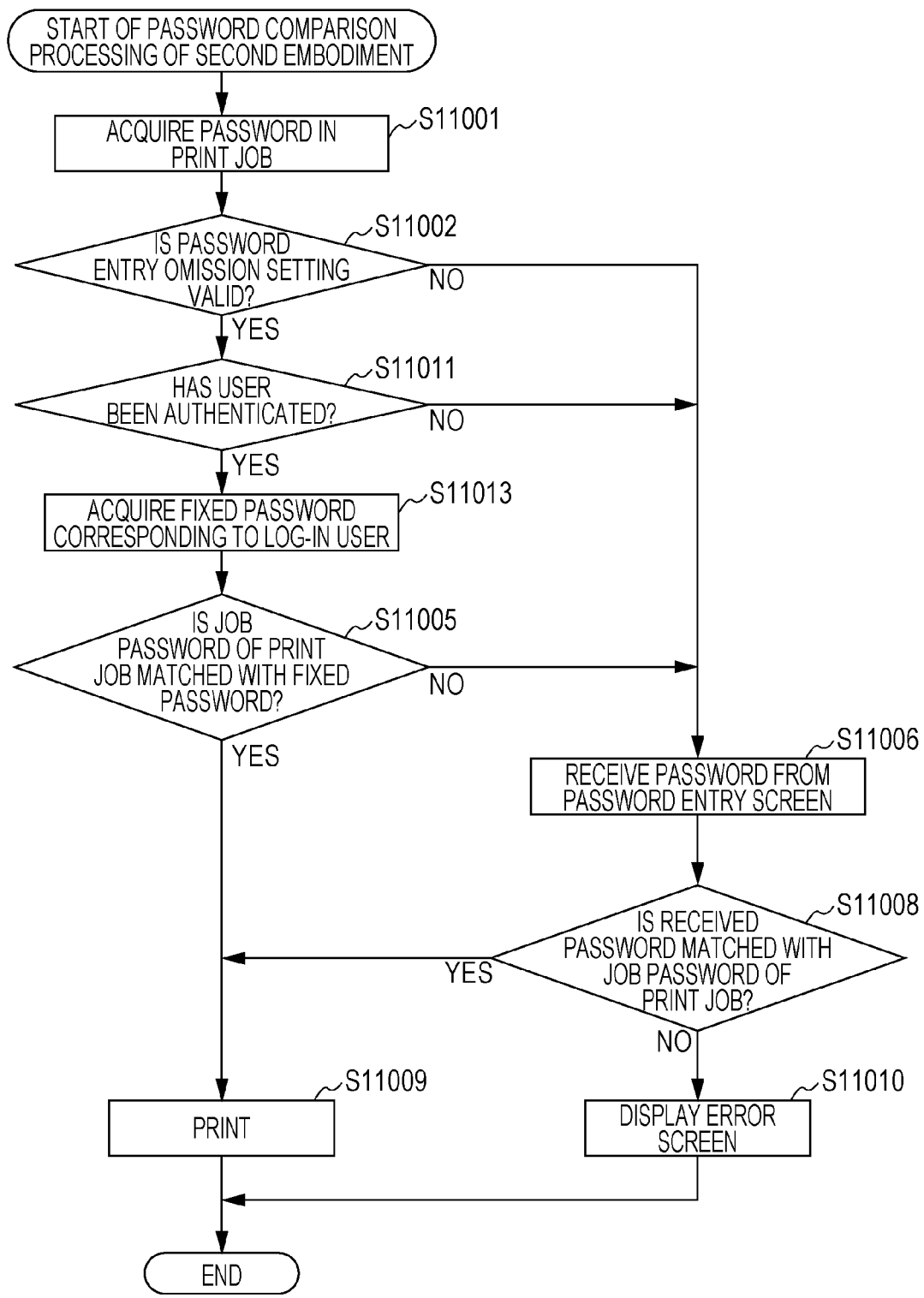
FIG. 11 is a flowchart describing printing processing to be executed according to a second embodiment.

FIG. 11 illustrates a flowchart for password comparison processing to be performed on a password-protected printing job according to the second embodiment.

The flowchart in FIG. 11 is different from the first embodiment in that operations in S11011 and S11013 are added to the flowchart in FIG. 7. The other operations, that is, the operations in S11001 to S11002, and S11005 to S11010 correspond to the operations in S7001 to S7002 and S7005 to S7010 on the flowchart in FIG. 7.

The second embodiment will be described below by focusing on the differences from the first embodiment.

Because S11001 and S11002 are similar to S7001 and S7002 in FIG. 7, the description will be omitted. If YES is determined in S11002, the processing moves to S11011 where the CPU 205 reads out a set value stored in the SRAM 213 in S6006 and determines whether a user authentication has been performed by the multifunction peripheral equipment 1000 or not.

If a user authentication has not been performed in S11011, the processing moves to S11006 where the CPU 205 displays a password entry screen on the operating unit 210 and receives entry of a password from a user. In this manner, this embodiment may be characterized in that a user is required to enter a password if a user authentication has not been performed though the password entry omission setting has a valid value.

On the other hand, if it is determine in S11011 that a user authentication has been performed, the processing moves to S11013 where the CPU 205 acquires a fixed password corresponding to a user name contained in the log-in context. The fixed password acquired here is a fixed password managed for each user and is store in the HDD 208 in association with a user name for authentication.

In S11005, the CPU 205 compares the acquired fixed password and the password extracted from the print job. If they are matched, the processing moves to S11009 where printing the image starts. This embodiment may further be characterized in that a fixed password that is different for each user is registered with the multifunction peripheral equipment 1000 and that a fixed password corresponding to a log-in user is acquired from a plurality of fixed passwords that have been registered.

The operations of the second embodiment have been described above. According to the second embodiment, if it is determined that the multifunction peripheral equipment 1000 has performed a user authentication, a printing operation is performed by omitting a password entry and if it is determined that the user authentication has not been performed, a user is required to enter a password to implement a printing operation. Thus, when a multifunction peripheral equipment operates in an environment allows a user authentication, a user may not be required to enter a password, advantageously. When a multifunction peripheral equipment operates in an environment where user authentication is not available, the password entry is required to maintain security.

According to the second embodiment, even when the password entry omission setting is valid, a user is required to enter a password if the user has not been authenticated. This may prevent execution of a password-protected printing job by a user who is not an owner of the job without entering a password.

According to the second embodiment, a user is always required to enter a password when the user has not been authenticated even when the password entry omission setting is valid. However, validating the password entry omission setting may be prohibited first in an environment where the multifunction peripheral equipment 1000 is available without a user authentication. Whether the multifunction peripheral equipment 1000 is available without a user authentication or not may be determined with reference to the set value in the SRAM 213 which has been used in the determining processing (on whether a user authentication is to be performed or not) in S5001. If it is determined that the multifunction peripheral equipment 1000 is available without a user authentication, the selection of the valid button 10002 is disabled on the screen in FIG. 10.

Third Embodiment

According to the third embodiment, a password entry operation may be omitted not only in the multifunction peripheral equipment 1000 but also in the PC 2000 if a password entry omission setting defined in the multifunction peripheral equipment 1000 is valid and omission of entry of a fixed password is selected in the printer driver 22.

The system configurations and hardware configuration of apparatuses according to the third embodiment are same as those of the first embodiment.

Processing of transmitting a password-protected printing job from the PC 2000 according to the third embodiment will be described with reference to FIG. 12.

Figure 12:
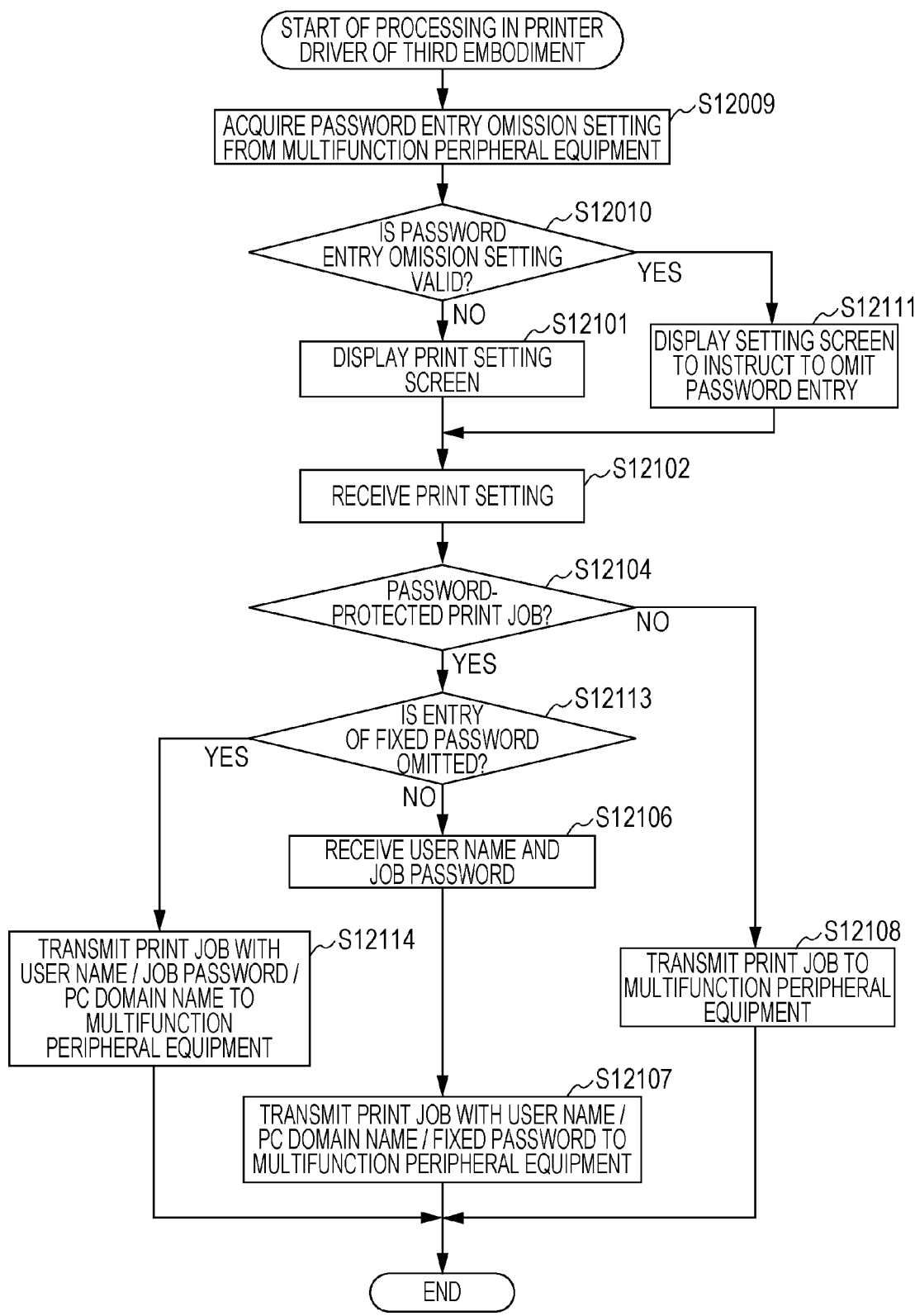
FIG. 12 is a flowchart describing processing of transmitting a print-job according to a third embodiment.

FIG. 12 is a flowchart for describing processing of transmitting a password-protected printing job from the PC 2000 to the multifunction peripheral equipment 1000.

The flowchart in FIG. 12 is same as the flowchart in FIG. 2 except that operations in S12009, S12010, S12111, S12113, and S12114 are added to the operations in FIG. 2 according to the first embodiment.

In other words, S12101 in FIG. 12 corresponds to S2001 in FIG. 2, and S12002 in FIG. 12 corresponds to S2002 in FIG. 2. S12103 in FIG. 12 corresponds to S2003 in FIG. 2, and S12104 in FIG. 12 corresponds to S2004 in FIG. 2. S12106 in FIG. 12 corresponds to S2006 in FIG. 2, and S12107 in FIG. 12 corresponds to S2007 in FIG. 2. S12108 in FIG. 12 corresponds to S2008 in FIG. 2.

Differences in the third embodiment from the first embodiment will be described.

In S12009, the printer driver 22 acquires from the multifunction peripheral equipment 1000 a password entry omission setting (see FIG. 10) stored in the SRAM 213 in the multifunction peripheral equipment 1000 through the PC communication unit 25. Next, the printer driver 22 determines whether the acquired password entry omission setting for the multifunction peripheral equipment 1000 indicates a valid value or an invalid value (S12010).

If it is determined in S12010 that the password entry omission setting indicates an invalid value, the printer driver 22 displays a normal print setting screen 0301 on the PC display unit 24 (S12101). In other words, the print setting screen displayed here is same as those in the first or second embodiment.

On the other hand, if the printer driver 22 determines in S12010 that the acquired password entry omission setting for the multifunction peripheral equipment 1000 indicates a valid value, the processing moves to S12111.

In S12111, the printer driver 22 displays a setting screen 1301 which allows instructing omission of a password entry on the PC display unit 24.

Figure 13:
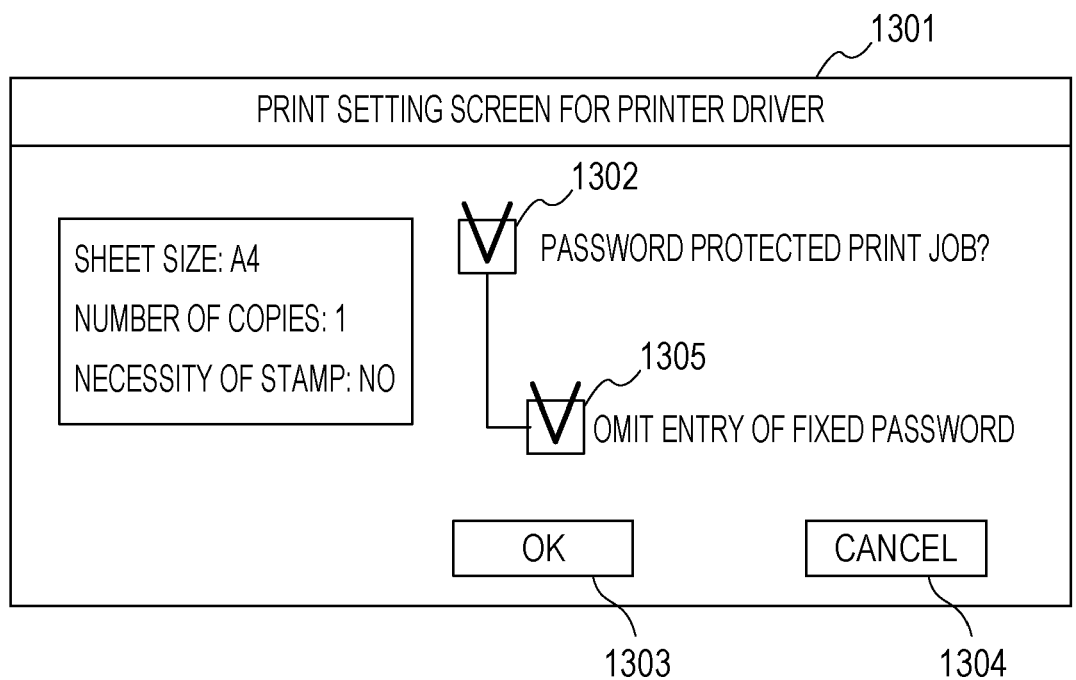
FIG. 13 is an example of a setting screen for a printer driver according to the third embodiment.

FIG. 13 illustrates the setting screen 1301 which allows to instruct omission of a password entry displayed on the PC display unit 24 by the printer driver 22 in S12111. The setting screen 1301 has a setting 1305 for omitting a password entry not in the multifunction peripheral equipment 1000 but in the PC 2000. In other words, when a check box for the setting 1305 is checked, the password entry is not required both in the multifunction peripheral equipment 1000 and in PC 2000. However, the setting 1305 may be defined only when the password entry omission setting is valid in the multifunction peripheral equipment 1000.

The operations in S12101, S12102, and S12104 are same as those in the first embodiment, the description will be omitted.

If YES is determined in S12104, the printer driver 22 acquires the setting 1305 (S12112).

Next, in S12113, the printer driver 22 refers to the setting 1305 and determines whether the entry of a fixed password may be omitted or not. If the setting 1305 indicates an invalid value, it is determined that the password entry will not be omitted. The printer driver 22 displays a screen as illustrated in FIG. 3B and receives a user name and a password to be added to the password-protected printing job (S12106).

If it is determined that the setting 1305 for omission of password entry indicates a valid value (YES in S12113), the processing moves to S12114. In S12114, the printer driver 22 generates a password-protected printing job containing data to be printed to which a user name and a fixed password entry omission flag (instruction information) have been added and transmits it to the multifunction peripheral equipment 1000. Unlike the first embodiment, it is configured not to accept entry of a user name and/or a job password. In this case, a user name preset as an initial value in the PC 2000 is added to a print job. However, it may be configured to accept a user name only.

According to the second embodiment, the printer driver 22 transmits a fixed password entry omission flag (instruction information) when a password-protected printing job is transmitted to the multifunction peripheral equipment 1000. This allows omission of a fixed password entry by a user not only in the multifunction peripheral equipment 1000 but in the PC 2000.

Next, control over processing of receiving a password-protected printing job to be executed by the multifunction peripheral equipment 1000 according to the third embodiment will be described in detail with reference to FIG. 14.

Figure 14:
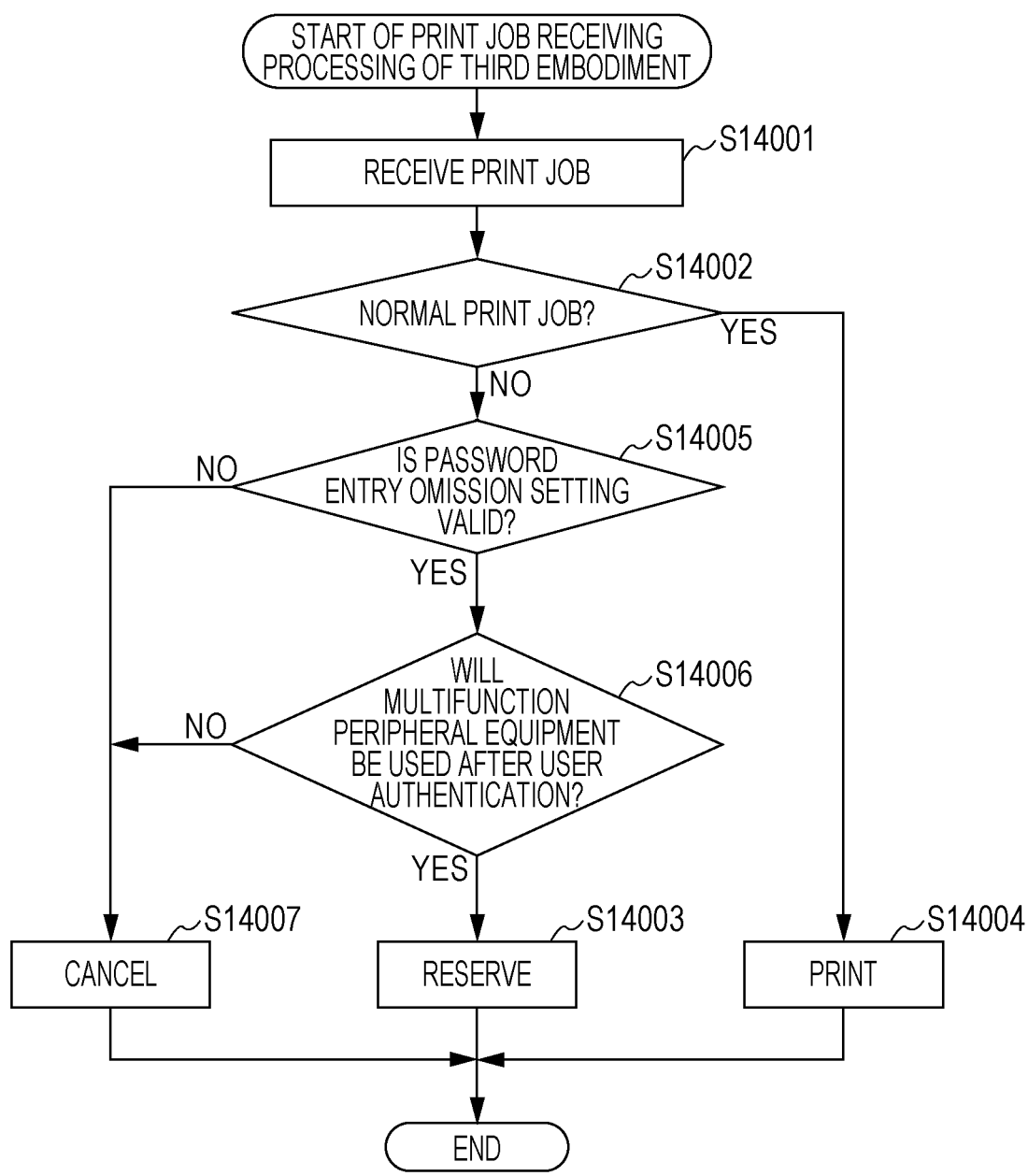
FIG. 14 is a flowchart describing processing of receiving a print job according to the third embodiment.

The flowchart in FIG. 14 includes the operations in S14005 to S14007 in addition to FIG. 4. The added operations relate to control over processing of receiving a password-protected printing job with a fixed password entry omission flag.

First, in S14001, the CPU 205 receives a print job transmitted from the PC 2000, for example, through the network interface 211 and extract print data and print settings from the received print job. The CPU 205 transfers the extracted print data to the RIP unit 218. The RIP unit 218 decompresses the received print data to a bitmap image and stores it in the HDD 208.

In S14002, if the CPU 205 determines that the received print job is a password-protected printing job, the processing moves to S14005. If the CPU 205 determines that it is not a password-protected printing job, the processing moves to S14004. If it is determined in S14002 that it is not a password-protected printing job (that is, it is a normal print job), the CPU 205 in S14004 outputs the bitmap image decompressed by the RIP unit 218 to the printer 202. In response thereto, the printer 202 prints the image on a print sheet on the basis of the received bitmap image data.

In S14005, the CPU 205 acquires the password entry omission setting from the SRAM 213 and determines whether the password entry omission setting for the multifunction peripheral equipment 1000 is valid or not. If it is determined in S14005 that the password entry omission setting for the multifunction peripheral equipment 1000 is valid, the processing moves to S14006.

In S14006, the CPU 205 acquires the settings for the multifunction peripheral equipment 1000 stored in the SRAM 213 and determine whether they are settings to be used by the multifunction peripheral equipment 1000 after a user authentication or not. If YES is determined in S14006, the CPU 205 reserves the received password-protected printing job in a print standby state (S14003) without printing it.

If the CPU 205 in S14005 determines that the password entry omission setting for the multifunction peripheral equipment 1000 is invalid, the acceptance of the received password-protected printing job is denied, and the job is cancelled. The failure of the print job reception processing is written to the log, and the processing ends.

If NO is determined in S14006, acceptance of the received password-protected printing job is denied. The failure in the print job reception processing is written to the log, and the processing ends.

Under the control above, acceptance of a received password-protected printing job is denied if the password entry omission is set invalid on the multifunction peripheral equipment 1000. This may prevent reservation of an unnecessary password-protected printing job for which password entry omission is set in a multifunction peripheral equipment which does not support omission of password entry.

Next, with reference to FIG. 15, there will be described control over printing processing on a password-protected printing job to be executed by the multifunction peripheral equipment 1000 according to the third embodiment.

Figure 15:
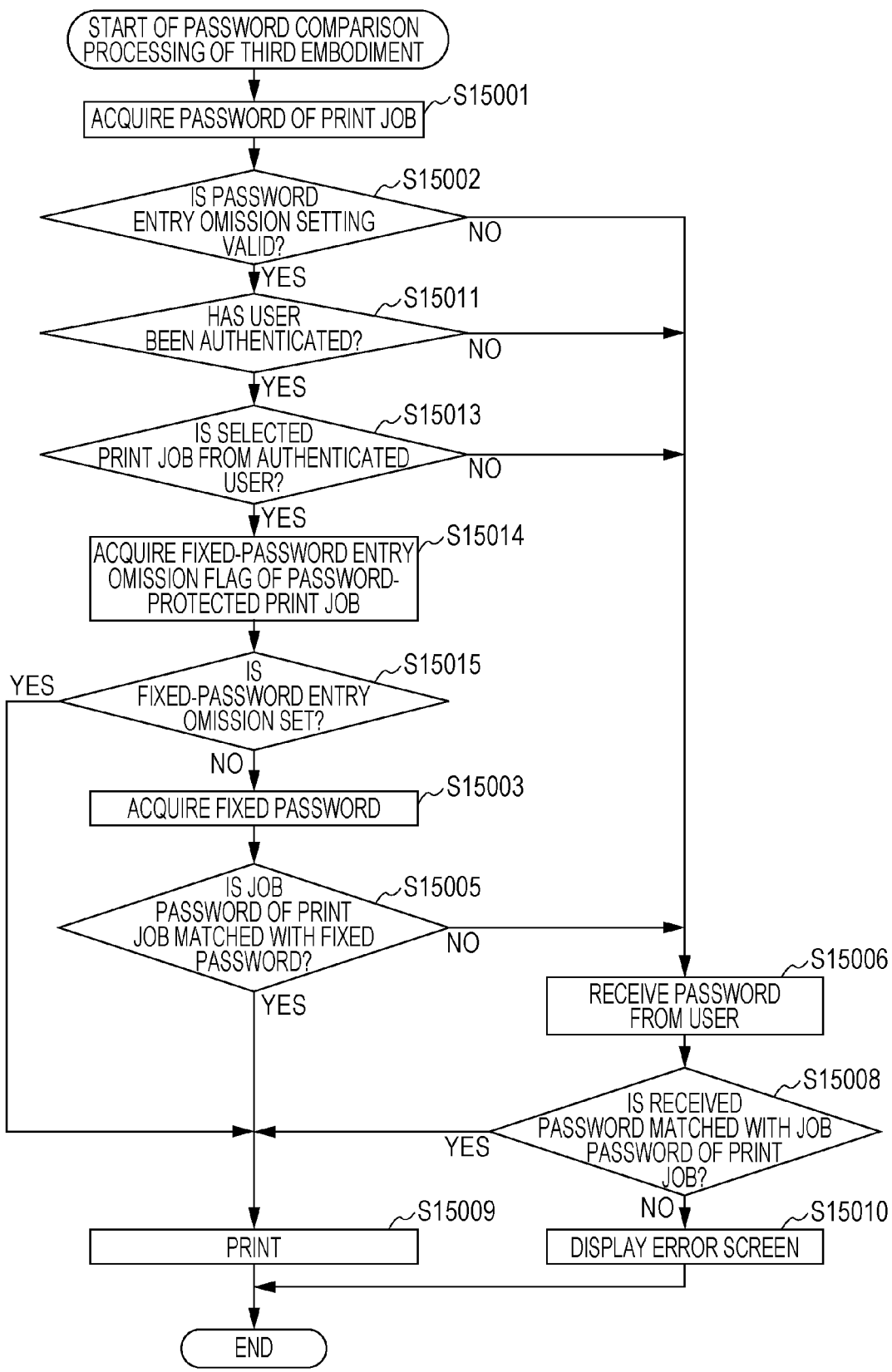
FIG. 15 is a flowchart describing a flow of processing of printing according to the third embodiment.

The flowchart in FIG. 15 further includes operations in S15013, S15014, and S15015 in addition to the processing in FIG. 11. The added operations relate to control for changing operations on a job in accordance with a fixed password entry omission flag for a password-protected printing job, which will be describe below in detail.

Now, a difference in the third embodiment from the second embodiment will be described.

Because the operations in S15001, S15002, and S15011 are same as those in S11001, S11002, and S11011 in FIG. 11, the description will be omitted.

In S15013, the CPU 205 determines whether the password-protected printing job instructed to print is a job from an authenticated user or not. In other words, the CPU 205 determines YES in S15013 if a user name of an authenticated user and a user name for a password-protected printing job instructed to print are matched. If not, NO is determined in S15013. If YES is determined in S15013, the processing moves to S15014 where the CPU 205 acquires a fixed password entry omission flag from the password-protected printing job. If NO is determined in S15013, the processing moves to S15006.

In S15014, the CPU 205 acquires a fixed password entry flag from the password-protected printing job. Next, in S15015, the CPU 205 determines whether the acquired fixed password entry omission flag for the password-protected printing job is valid or not. If it is determined in S15015 that the acquired fixed password entry omission flag for the password-protected printing job is invalid, the CPU 205 in S15003 acquires a fixed password from the SRAM 213. Because the operations in S15005, S15006, S15008, and S15010 are same as those in S11005, S11006, S11008, and S11010 in FIG. 11, the description will be omitted.

If the CPU 205 in S15015 determines that the acquired fixed password entry omission flag for the password-protected printing job is valid (YES in S15015), the printing of the password-protected printing job is executed (S15009).

Under the control above, the multifunction peripheral equipment 1000 may acquire a fixed password entry omission flag to determine whether entry of a job password may be omitted for a given print or not. This allows execution of a print job transmitted without entry of a fixed password by a user.

There have been described control to transmit a print job with a fixed password entry omission flag if a printer driver determines that a password entry omission setting for a destination multifunction peripheral equipment is valid and control over the multifunction peripheral equipment which receives and prints it. This control allows omission of entry of a fixed password by a user in a printer driver.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc CD, digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus used in an image forming system that has a storing portion, an operating portion, an image forming portion, and an authentication portion, the operating portion being a portion that is capable of accepting a print instruction from an operation user, the authentication portion being a portion that authenticates the operation user as an input user, the storing portion being a portion that stores print data and is capable of storing print data associated with the input user, with a password for performing authentication different from the authenticating the operation user as the input user and set for said print data, said print data for which the password is set being hereinafter referred to as password-set print data, the image forming portion being a portion that is capable of executing a print process of forming an image on a recording medium on the basis of the print data, comprising:
   a controlling portion that includes at least one memory for storing a program and at least one processor for executing the program, the controlling portion being configured:
      to cause the image forming portion to perform processing for printing out the password-set print data in accordance with a print instruction without inputting the password on the basis of authentication of the operation user as the input user by the authentication portion; and
      to cause the image forming portion to perform processing for printing out the password-set print data in accordance with a print instruction with inputting the password not on the basis of the authentication by the authentication portion.

2. The image processing apparatus according to claim 1, wherein, in a case where the user instructs that the password-set print data to be printed out, the operating portion is capable of selectively executing a plurality of notification modes including a first notification mode, in which the user is prompted to give the print instruction without inputting the password, and a second notification mode, in which the user is prompted to give the print instruction with inputting the password.

3. The image processing apparatus according to claim 2, wherein the controlling portion is capable of executing a plurality of setting modes including a first setting mode, in which the notification mode of the operating portion among the plurality of notification modes is set on the basis of the authentication of the operation user as the input user by the authentication portion, and a second setting mode, in which the notification mode of the operating portion among the plurality of notification modes is set regardless of whether the operation user is authenticated as the input user by the authentication portion or not.

4. The image processing apparatus according to claim 3, wherein the operating portion is capable of accepting a setting instruction for setting the setting mode of the controlling portion among the plurality of setting modes.

5. The image processing apparatus according to claim 1, wherein the authentication portion is capable of selectively executing one mode among a plurality of modes including a first mode in which it is determined whether to authenticate the operation user as the input user or not before the print instruction is given and a second mode in which said determination is not performed before the print instruction is given.

6. The image processing apparatus according to claim 5, wherein, in a case where the operation user is authenticated as the input user by the authentication portion that is currently executing the first mode, the operating portion is capable of accepting the print instruction for, among the print data stored in the storing portion, only the print data inputted by the authenticated operation user.

7. The image processing apparatus according to claim 5, wherein, in a case where the authentication portion is currently executing the second mode, the operating portion is capable of accepting the print instruction for the print data of all of the users mentioned above among the print data stored in the storing portion.

8. An image processing apparatus comprising:
   an image forming unit configured to execute an image forming process;
   an authentication unit configured to authenticate a user;
   a controlling unit having a processor which executes instructions stored in a memory or having circuitry, the controlling unit being configured to:
      acquire password-set print data;
      receive a print instruction from a user authenticated by the authentication unit, and cause the image forming unit to perform the image forming process based on the password-set print data, associated with the authenticated user, without an input of the password for performing authentication different from the authenticating the user in accordance with the print instruction; and
      receive a print instruction from a user who is not authenticated by the authentication unit, and cause the image forming unit to perform the image forming process based on the password-set print data with an input of the password for performing authentication different from the authenticating the user in accordance with the print instruction.

9. The image processing apparatus according to claim 8, wherein the controlling unit is capable of receiving setting of a mode that is among a plurality of modes including a first mode and a second mode,
   wherein, in a state in which the first mode is set to the controlling unit, the controlling unit is configured to receive a first print instruction from a user who is authenticated in accordance with identification information of a user authenticated by the authentication unit, and
   wherein, in a state in which the second mode is set to the controlling unit, the controlling unit is configured to receive a second print instruction from a user who is not authenticated.

10. The image processing apparatus according to claim 9, wherein the first mode is a mode in which the authentication using the authentication unit is required before a print instruction is received, and
wherein the second mode is a mode in which the authentication using the authentication unit is not required before a print instruction is received.

11. The image processing apparatus according to claim 10, wherein the second mode is a mode in which the authentication unit is not used.

12. The image processing apparatus according to claim 9, wherein the image processing apparatus is capable of using a display unit configured to display information,
wherein, in the first mode, the controlling unit causes the display unit to display a screen prompting the first print instruction in accordance with identification information of a user authenticated by the authentication unit, and
wherein, in the second mode, the controlling unit causes the display unit to display a screen prompting the second print instruction, the displaying not being based on the authentication unit.

13. The image processing apparatus according to claim 12, wherein print data subject to the first print instruction is print data selected from among pieces of print data associated with the authenticated user, the pieces of print data being included in pieces of print data that can be processed by the image processing apparatus.

14. The image processing apparatus according to claim 12, wherein print data subject to the second print instruction is print data selected from among all the pieces of print data that can be processed by the image processing apparatus.

15. An image processing apparatus which uses an image forming unit configured to execute an image forming process, and an authentication unit configured to authenticate a user, the image processing apparatus comprising:
a controlling unit having a processor which executes instructions stored in a memory or having circuitry, the controlling unit being configured to:
acquire password-set print data;
receive a print instruction from a user authenticated by the authentication unit, and cause the image forming unit to perform the image forming process based on the password-set print data, associated with the authenticated user, without an input of the password for performing authentication different from the authenticating the user in accordance with the print instruction; and
receive a print instruction from a user who is not authenticated by the authentication unit, and cause the image forming unit to perform the image forming process based on the password-set print data with an input of the password for performing authentication different from the authenticating the user in accordance with the print instruction.

16. The image processing apparatus according to claim 15,
wherein the controlling unit is capable of receiving setting of a mode that is among a plurality of modes including a first mode and a second mode,
wherein, in a state in which the first mode is set to the controlling unit, the controlling unit is configured to receive the first print instruction in accordance with identification information of a user authenticated by the authentication unit, and
wherein, in a state in which the second mode is set to the controlling unit, the controlling unit is configured to receive the second print instruction.

17. The image processing apparatus according to claim 16,
wherein the first mode is a mode in which the authentication using the authentication unit is required before a print instruction is received, and
wherein the second mode is a mode in which the authentication using the authentication unit is not required before a print instruction is received.

18. The image processing apparatus according to claim 17, wherein the second mode is a mode in which the authentication unit is not used.

19. The image processing apparatus according to claim 16,
wherein the image processing apparatus is capable of using a display unit configured to display information,
wherein, in the first mode, the controlling unit causes the display unit to display a screen prompting the first print instruction in accordance with identification information of a user authenticated by the authentication unit, and
wherein, in the second mode, the controlling unit causes the display unit to display a screen prompting the second print instruction, the displaying not being based on the authentication unit.

20. The image processing apparatus according to claim 19, wherein print data subject to the first print instruction is print data selected from among pieces of print data associated with the authenticated user, the pieces of print data being included in pieces of print data that can be processed by the image processing apparatus.

21. The image processing apparatus according to claim 19, wherein print data subject to the second print instruction is print data selected from among all the pieces of print data that can be processed by the image processing apparatus.

22. A method for controlling a computer included in an image processing system as at least a part of the image processing system, the image processing system including an image forming unit configured to execute an image forming process, and an authentication unit configured to authenticate an operator, the method comprising:
acquiring password-set print data;
receiving a print instruction from a user authenticated by the authentication unit, and causing the image forming unit to perform the image forming process based on the password-set print data, associated with the authenticated user, without an input of the password for performing authentication different from the authenticating the operator in accordance with the print instruction; and
receiving a print instruction from a user who is not authenticated by the authentication unit, and causing the image forming unit to perform the image forming process based on the password-set print data with an input of the password for performing authentication different from the authenticating the operator in accordance with the print instruction.

23. A non-transitory computer-readable storage medium storing a program causing a computer, included in an image processing system as at least a part of the image processing system, the image processing system including an image forming unit configured to execute an image forming process based on print data, and an authentication unit configured to authenticate an operator, to execute:
acquiring password-set print data;
receiving a print instruction from a user authenticated by the authentication unit, and causing the image forming unit to perform the image forming process based on the password-set print data, associated with the authenticated user, without an input of the password for performing authentication different from the authenticating the operator in accordance with the print instruction; and receiving a print instruction from a user who is not authenticated by the authentication unit, and causing the image forming unit to perform the image forming process based on the password-set print data with an input of the password for performing authentication different from the authenticating the operator in accordance with the print instruction.

24. An image processing apparatus comprising:
an image forming unit configured to execute an image forming process;
an authentication unit configured to authenticate a user;
a controlling unit having a processor which executes instructions stored in a memory or having circuitry, the controlling unit being configured to:
acquire password-set print data;
use the authentication unit, and cause the image forming unit to perform the image forming process based on the password-set print data, associated with the authenticated user, without an input of the password for performing authentication different from the authenticating the user in accordance with a print instruction; and
not use the authentication unit, and cause the image forming unit to perform the image forming process based on the password-set print data with an input of the password for performing authentication different from the authenticating the user in accordance with a print instruction.

25. The image processing apparatus according to claim 24,
wherein the controlling unit is capable of receiving setting of a mode that is among a plurality of modes including a first mode and a second mode,
wherein, in a state in which the first mode is set to the controlling unit, the controlling unit is configured to receive a first print instruction from a user who is authenticated, and
wherein, in a state in which the second mode is set to the controlling unit, the controlling unit is configured to receive a second print instruction from a user who is not authenticated.

26. The image processing apparatus according to claim 25,
wherein the first mode is a mode in which the authentication using the authentication unit is required before a print instruction is received, and
wherein the second mode is a mode in which the authentication using the authentication unit is not required before a print instruction is received.

27. The image processing apparatus according to claim 26, wherein the second mode is a mode in which the authentication unit is not used.

28. The image processing apparatus according to claim 25,
wherein the image processing apparatus is capable of using a display unit configured to display information,
wherein, in the first mode, the controlling unit causes the display unit to display a screen prompting the first print instruction, and
wherein, in the second mode, the controlling unit causes the display unit to display a screen prompting the second print instruction, the displaying not being based on the authentication unit.

29. The image processing apparatus according to claim 28, wherein print data subject to the first print instruction is print data selected from among pieces of print data associated with the authenticated user, the pieces of print data being included in pieces of print data that can be processed by the image processing apparatus.

30. The image processing apparatus according to claim 28, wherein print data subject to the second print instruction is print data selected from among all the pieces of print data that can be processed by the image processing apparatus.

31. An image processing apparatus which uses an image forming unit configured to execute an image forming process, and an authentication unit configured to authenticate a user, the image processing apparatus comprising:
a controlling unit having a processor which executes instructions stored in a memory or having circuitry, the controlling unit being configured to:
acquire password-set print data;
use the authentication unit, and cause the image forming unit to perform the image forming process based on the password-set print data, associated with the authenticated user, without an input of the password for performing authentication different from the authenticating the user in accordance with a print instruction; and
not use the authentication unit, and cause the image forming unit to perform the image forming process based on the password-set print data with an input of the password for performing authentication different from the authenticating the user in accordance with a print instruction.

32. The image processing apparatus according to claim 31,
wherein the controlling unit is capable of receiving setting of a mode that is among a plurality of modes including a first mode and a second mode,
wherein, in a state in which the first mode is set to the controlling unit, the controlling unit is configured to receive the first print instruction, and
wherein, in a state in which the second mode is set to the controlling unit, the controlling unit is configured to receive the second print instruction.

33. The image processing apparatus according to claim 32,
wherein the first mode is a mode in which the authentication using the authentication unit is required before a print instruction is received, and
wherein the second mode is a mode in which the authentication using the authentication unit is not required before a print instruction is received.

34. The image processing apparatus according to claim 33, wherein the second mode is a mode in which the authentication unit is not used.

35. The image processing apparatus according to claim 32,
wherein the image processing apparatus is capable of using a display unit configured to display information,
wherein, in the first mode, the controlling unit causes the display unit to display a screen prompting the first print instruction, and
wherein, in the second mode, the controlling unit causes the display unit to display a screen prompting the second print instruction, the displaying not being based on the authentication unit.

36. The image processing apparatus according to claim 35, wherein print data subject to the first print instruction is print data selected from among pieces of print data associated with the authenticated user, the pieces of print data being included in pieces of print data that can be processed by the image processing apparatus.

37. The image processing apparatus according to claim 35, wherein print data subject to the second print instruction is print data selected from among all the pieces of print data that can be processed by the image processing apparatus.

38. A method for controlling a computer included in an image processing system as at least a part of the image processing system, the image processing system including an image forming unit configured to execute an image forming process, and an authentication unit configured to authenticate a user, the method comprising:

acquiring password-set print data;

using the authentication unit, and causing the image forming unit to perform the image forming process based on the password-set print data, associated with the authenticated user, without an input of the password for performing authentication different from the authenticating the user in accordance with a print instruction; and doing not use the authentication unit, and causing the image forming unit to perform the image forming process based on the password-set print data with an input of the password for performing authentication different from the authenticating the user in accordance with a print instruction.

39. A non-transitory computer-readable storage medium storing a program causing a computer, included in an image processing system as at least a part of the image processing system, the image processing system including an image forming unit configured to execute an image forming process based on print data, and an authentication unit configured to authenticate a user, to execute:

acquiring password-set print data;

using the authentication unit, and causing the image forming unit to perform the image forming process based on the password-set print data, associated with the authenticated user, without an input of the password for performing authentication different from the authenticating the user in accordance with a print instruction; and not using the authentication unit, and causing the image forming unit to perform the image forming process based on the password-set print data with an input of the password for performing authentication different from the authenticating the user in accordance with a print instruction.

* * * * *